United States Patent [19]

Poel et al.

[11] Patent Number: 4,750,229
[45] Date of Patent: Jun. 14, 1988

[54] DEVICE FOR THE WASHING OF EGGS

[75] Inventors: Hermanus C. Poel, Cuijk; Martinus J. M. Boumans, Vianen; Metheus E. Antonis, Rijkevoort, all of Netherlands

[73] Assignee: Antonis, Netherlands

[21] Appl. No.: 848,268

[22] Filed: Apr. 4, 1986

[30] Foreign Application Priority Data

Apr. 4, 1985 [NL] Netherlands ................... 8501018

[51] Int. Cl.$^4$ ............................................. A01K 43/00
[52] U.S. Cl. ..................................... 15/3.13; 15/3.16;
198/402; 198/734
[58] Field of Search ................... 15/3.1–3.14,
15/3.16–3.18, 3.21; 198/402, 717, 734; 51/22, 23

[56] References Cited

U.S. PATENT DOCUMENTS

| | | | |
|---|---|---|---|
| 1,780,924 | 11/1930 | Ingraham | 15/3.13 |
| 2,408,648 | 10/1946 | Inman | 15/3.16 |
| 2,566,475 | 9/1951 | Wright | 15/3.14 |
| 3,447,176 | 6/1969 | Butterworth et al. | 15/3.11 |
| 3,449,779 | 6/1969 | Butterworth | 15/3.16 |

Primary Examiner—Edward L. Roberts

[57] ABSTRACT

The invention relates to a device for washing of eggs in order to remove adhering dirt in which egg transport means and egg guiding means are present. The egg transport means and egg guiding means cooperate and form egg rotation means which cause an egg to rotate substantially around its shortest main axis; dirt removal is achieved with use of one or more brushes and a washing liquid. The egg's longest main axis thereby remains substantially in a plane parallel to the direction of transport of the eggs, said plane being perpendicular to the plane going through the centerlines of the egg guiding means.

11 Claims, 3 Drawing Sheets

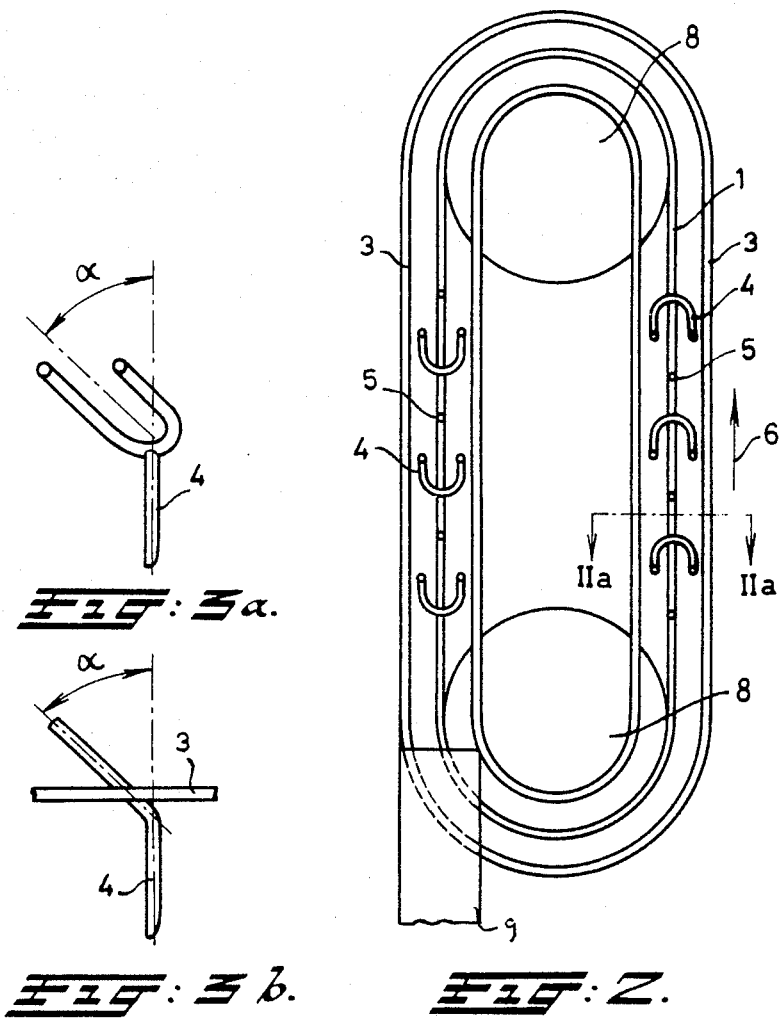

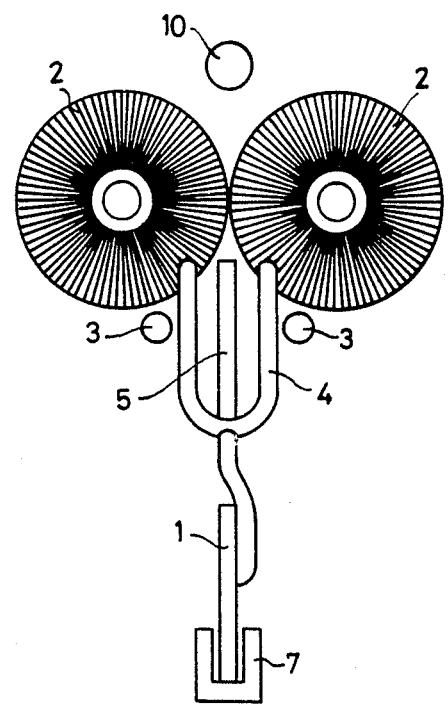
FIG: 2a.

DEVICE FOR THE WASHING OF EGGS

BACKGROUND OF THE INVENTION

The present invention relates to a device for the removal of adhering dirt from eggs by means of a washing liquid comprising at least
  washing liquid supply-means
  means for the generation of a relative movement of the eggs with respect to the washing liquid
  transport means for transporting of the eggs to be cleaned
  egg guiding means
  egg-surface cleaning means.

A device of this type consisting of a container wherein the eggs to be cleaned are received, whereafter as a result of slight heating and the use of a washing liquid in the form of water containing a surface-active substance, the dirt is removed from the eggs, is known.

A device is also known wherein the washing liquid contained in the container is set in rigorous motion by means of air passed through; the adhering dirt is then removed by the slight mechanical load more quickly from the eggs than in the device described above.

These known devices have the disadvantage that the operation thereof is time-consuming and consequently expensive as a result of the discontinuous character; a still greater disadvantage, however, lies in the fact that eggs, after having been in contact with a surface-active substance, are more susceptible to mould during storage and transport, the more so since, as a result of the manner of operation some dirt always deposits again on the outside of the eggs from the adhering liquid. Mouldy eggs are unsaleable and often even a batch wherein a few mouldy eggs are contained is rejected as a whole so that this results in large losses.

The purchaser of eggs, however, expects to receive clean eggs, not covered, for example, with excrements, from his supplier.

SUMMARY OF THE INVENTION

It is an object of the present invention to provide a device for removal of adhering dirt from eggs with which in short time, at low cost in a continuous process eggs may be cleaned which will show no tendency to get mouldy.

The abovementioned object is achieved according to the invention in that the device is provided with egg-rotation means which cause an egg to rotate substantially around its shortest main axis.

With this device it is possible to clean eggs in a continuous process making use of pure water at ambient temperature or at elevated temperature up to approximately 43° C. as washing liquid, in which process absolutely clean eggs are obtained which exhibit no tendency to mould during storage.

As a result of the combined action of water and brushes on the eggs set in relative motion, all the adhering dirt is expediently removed.

More specifically, upon rotation of the eggs around the shortest main axis, during which rotation the longest axis remains substantially in a plane which is parallel to the direction of movement of the egg transport means and perpendicular to the plane going through the egg guiding means, the following further advantages are obtained:

(a) less breaking of eggs because of the fact that eggs in a direction parallel to the longest main axis are stronger than in a direction perpendicular to said axis;

(b) the egg's air chamber is better maintained in its correct position;

(c) upon cleaning of brood-eggs less damage of the contents of the egg will occur; upon rotating around the longest main axis for instance, because of inertia, the contents will lag behind with respect to the egg-shell. This undesirable phenomenon will not occur upon rotating the egg around its shortest main axis.

In particular the brush element is driven in a rotating manner and the brush element expediently comprises two brushes, to be driven in an oppositely rotating manner, the shafts of which are essentially parallel to the direction of movement of the eggs.

As a result of the combination of egg transport and mechanical brushing in the presence of a washing liquid such as water, an excellent cleaning of the eggs is obtained.

More particularly, the transport means for the transporting of the eggs is formed by an endless belt.

In an advantageous embodiment the endless belt is provided with protuberances for carrying along the eggs to be cleaned.

As the result of protuberances being present a uniform transport is ensured and, provided a protuberance is always situated between two eggs, the possibility is prevented that eggs collide with one another, which results in reduced breakage.

The egg guiding means present in the device according to the invention are formed by at least two mutually parallel rod-shaped guides which extend parallel to the direction of movement of the endless belt.

In particular, the egg guides have a mutual distance which is smaller than the shortest main axis of the eggs to be cleaned and the protuberances on the belt pass through between the egg guides during the transport and project above them.

With much advantage the egg guides have a rough surface.

As a result of the combined influence of transport by means of the endless belt provided with protuberances and the action of the rough surface of the guides whereon the eggs rest during the transport, the eggs will perform a rotation, in this case around the shortest main axis.

The brush action proceeding at the same time provides for mechanical brushing on all sides, the washing liquid such as water supplied at the same time providing for washing action.

If the distance between the egg guides is larger than specified but smaller than the longest main axis of the eggs to be cleaned, rotation about the longest main axis of the eggs can be obtained.

More particularly, the endless belt is formed by a thin strip of flexible material standing with its plane vertical and the protuberances are formed by fork-shaped parts directed upwards.

The said fork-shaped parts directed upwards provide for an efficient carrying along of the eggs to be transported and to be cleaned.

The said fork-shaped parts are expediently formed from a hard rigid plastic material or metal, while the thin strip of flexible material standing with its plane vertical may be manufactured from plastic material or metal.

In cases in which a sudden stoppage of the installation occurs the eggs which are in motion would still be able to move further over a short distance as a result of inertia, while the endless belt provided with protuberances is stationary. In a case of this type breakage of the eggs to be cleaned would not be improbable because they would be able to collide with the fork-shaped protuberances.

In order to prevent this, the fork-shaped parts are followed with much advantage in the running direction by soft rod-shaped flexible parts also directed essentially vertically.

Said rod-shaped flexible parts are sufficiently soft to prevent breakage of eggs if eggs knock against them; on the other hand, the rod-shaped flexible parts are rigid enough to prevent shooting through of the eggs against the fork-shaped parts directed upwards as a result of inertia.

The fork-shaped parts are expediently inclined at an angle of 15°–30° to the direction of movement of the belt.

The abovementioned egg guides provided with a rough surface should have a mutual distance such that the eggs are supported by them and under no circumstances can get between them. In practice it has turned out that for most types of egg the mutual distance should lie between 30 and 45 mm.

For smaller or larger eggs the mutual distance of the egg guides must be adjusted accordingly.

The washing liquid supply means in an embodiment of the device are formed by washing liquid distribution means which extend parallel to the plane of intersection of the brush hair end envelopes.

In particular the washing liquid supply means are formed by a pipe in which orifices are arranged at a uniform distance.

After the washing process the eggs are transported by the combined action of the egg guide rods and the protuberances of the conveyor belt to a drying position of the device, the drying means present there being formed, according to a very advantageous embodiment of the device, by brushes arranged parallel to the direction of egg movement, to which in this case no washing liquid is supplied.

As a result of rotation of the eggs and the action of the rotating brushes, a spreading and scraping off of the washing water still adhering to the eggs is obtained; certainly in the case where the washing water is at temperature above room temperature, as a result of the spreading carried out of the washing water, a rapid evaporation thereof will be obtained which is so rapid that when the eggs are finally deposited an extremely short storage time is sufficient to allow all the adhering water to evaporate.

Following the drying process by means of brushes, the eggs are removed from the device, by unloading means connected to the egg guide rods and following the brush section, being provided with which the eggs are removed on a porous conveyor belt.

The unloading means may of course be manufactured in many manners; often they will consist of a trough leading upwards from the guide rods to a highest section, after which the trough bends downwards, the trough being formed in a manner such that the belt protuberances carry the eggs along to the highest point while precisely at this point or just past it the contact between the protuberances and the eggs is lost and the eggs are removed by the section of the trough bent downwards.

The porous conveyor belt is resilient and collects the eggs without damage.

If very high production rates are employed and if, for example, the water with which the eggs are washed is extremely cold, there may be disposed with advantage below the porous conveyor belt slit-shaped suction openings the maximum dimension of which is at least equal to the width of the porous conveyor belt. With said suction openings care can then be taken even to remove the last residues of adhering moisture.

With very much advantage pivoting retaining means for the eggs are disposed above the conveyor belt which rest with a controllable force against the belt.

By the conveyor belt the eggs are brought up against a pivoting retaining bracket resting on the belt; if a certain number of eggs has collected in front of the retainer, the pressure of the eggs against this rod becomes too great and the force with which the rod is pressed against the belt will no longer be adequate.

The retainer rod then pivots upwards and allows the eggs through which have collected in front of it.

In this way at the depositing section of the device a certain buffering action is provided. In a particular case there may also be located, arranged above the conveyor belt, a freely rotating roller which collects the eggs at the end of the conveyor belt.

As a result of the freely rotatable character of said roller the eggs will still rotate slightly while they are collecting in front of the said roller.

Finally the invention also relates to a method for the operation of the device according to the invention which is characterized in that the brushes rotate at 5 to 270 revolutions per minute, and preferably 150–250 r.p.m., while the endless belt has a speed of displacement of 300–1500 cm/min, and preferably 600–900 cm/min.

It is further pointed out that the capacity of the device can be increased in a simple manner by increasing the number of movement paths for eggs. Each doubling of the number of egg movement paths will also at least double the capacity. In this connection it is pointed out that the cleaning device can be formed by a cleaning train located in one line in which the endless belt rotates in a vertical plane; the installation may also be such that the endless belt rotates in a horizontal plane as a result of which the length of the installation with respect to the train-like installation is halved.

With regard to the objects to be cleaned in the device it is pointed out that the installation as described in the foregoing will preferably be used for the cleaning of eggs; other objects of more or less round shape such as fruit in the form of apples, oranges, tomatoes and the like and other round objects such as marbles and balls and the like may also be cleaned extremely well by means of the installation described.

A simple adaptation of the object guide system and perhaps an adaptation of the type of washing fluid will be sufficient in those cases to ensure a good operation.

The device described above has rotation means for the eggs in the form of a moving endless belt on which protuberances are disposed and guide means supporting the eggs which are provided with a rough surface. Of course, other manners of setting the eggs in rotation are possible. Thus, consideration can be given to the positioning of the eggs to be cleaned on an endless belt which moves forward, there being arranged above the moving endless belt rotating brushes which work together with each other and the axes of which are parallel to the direction of movement of the belt.

If the brushes have the same direction of rotation, as a result of the combined action of the mechanical brush movement and the displacement of the belt, a rotation of the eggs around their longest axis will occur as a result of which also the desired cleaning will be obtained.

In a case of this type the presence of egg guiding means such as egg guide rods in the vicinity of the belt surface will expediently be provided.

BRIEF DESCRIPTION OF THE DRAWINGS

FIG. 1 represents a perspective view of a part of the device.

FIG. 2a represents a sectional view taken along line IIa—IIa of FIG. 2.

FIGS. 3a and 3b represent fork-shaped parts of the endless belt.

DESCRIPTION OF THE PREFERRED EMBODIMENTS

Figure 2:
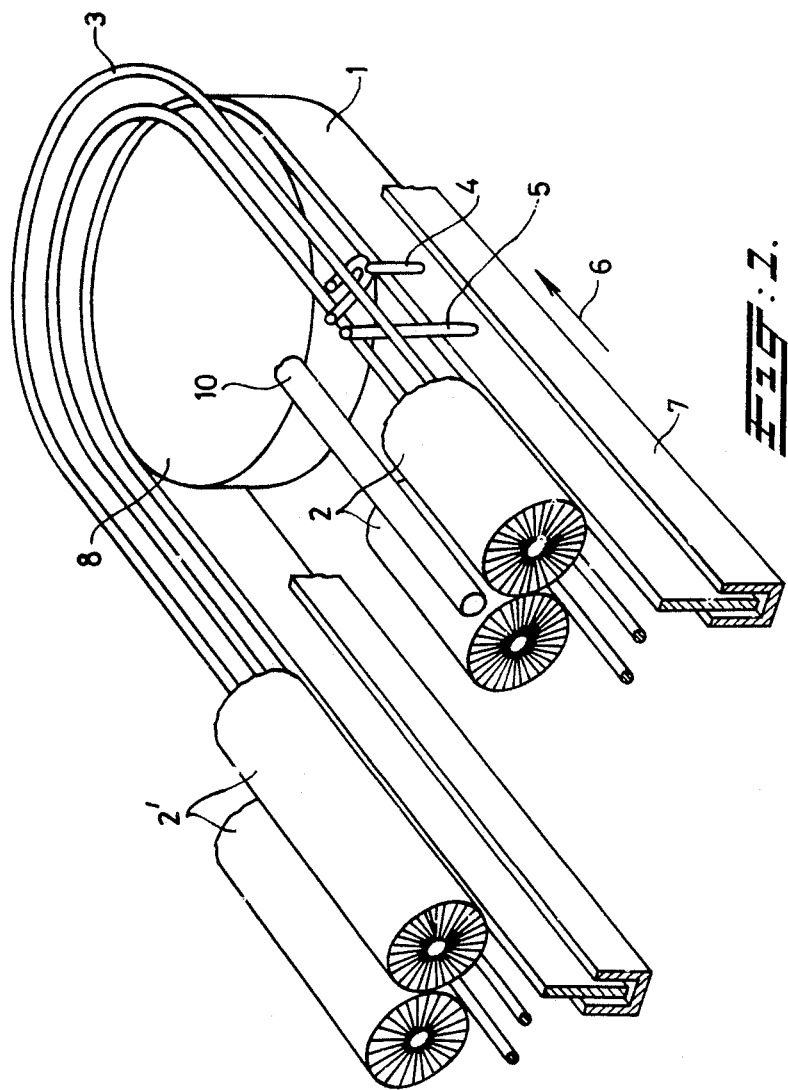
FIG. 2 represents a plan view of the device according to FIG. 1.

In FIG. 1 a section of an endless belt 1 can be seen which is formed here by a flexible plastic material strip which is arranged with its plane vertical. On the belt fork-shaped protuberances 4 are mounted and soft rod-shaped flexible parts 5 which are arranged essentially vertically.

The fork-shaped parts 4 and the flexible vertical rod-shaped parts 5 follow a path which runs through between the rod-shaped guides 3 arranged parallel to the direction of movement.

The length of the fork-shaped parts of the belt and the rod-shaped supple parts 5 is such that they project above the rod-shaped guides.

The direction of movement of the belt is represented by the arrow 6. An egg to be cleaned will be located in said FIG. 1, viewed in the direction of movement of the belt, in front of the fork-shaped part 4 and will be carried along by it. Eggs will be moved by the fork-shaped part 4 past brushes 2, which are supplied with washing liquid by washing liquid supply means 10, to clean the eggs.

In the event of any sudden stoppage of the belt a breakage of the eggs against the fork-shaped parts 4 will be prevented by the presence of the soft rod-shaped parts 5.

The endless belt 1 runs in a trough 7, while 8 indicates a reversing wheel or belt drive means for the belt 1. The eggs are dried by passing through brushes 2′, to which no washing liquid is supplied.

In FIG. 2 the device according to FIG. 1 is to be seen in plan view, the same parts being indicated by the same references numerals. Schematically removal means 9 are shown which connect to the rod-shaped guides 3 for the removal of eggs.

Said unloading means 9 are then followed by the porous conveyor belt described in the claims on which the eggs are received.

FIG. 2a is a view taken along line IIa—IIa of FIG. 2, illustrating the relationship of rod-shaped guides 3, fork-shaped parts 4, and flexible parts 5 to brushes 2.

FIGS. 3a and 3b show fork-shaped protuberances 4 which are attached to the endless belt 1, in which the angle between the fork-shaped section and the vertical is indicated.

The stem of the fork is here shown vertical, but it will be clear that the stem of the fork may also lie in the same plane as the fork.

In FIG. 3b the position of the egg guide rod 3 with respect to the fork-shaped part 4 is indicated.

The operation of the device will be illustrated in the example which follows below.

EXAMPLE

Considerably soiled eggs having a weight of 65 g. and a length of the smallest main axis of 35 mm were cleaned in the device according to the invention.

The belt in the device was running with a speed of 800 cm/min. 4,500 eggs were loaded per hour. The distance between the egg guides was 30 mm. A quantity of water of 160 litre/hour was quite sufficient to clean all eggs thoroughly; the water had a temperature of 40° C.

During cleaning the brushes rotated at 175 r.p.m. The brushes had a diameter of 135 mm.

The installation was of so-called double-fold type with a belt rotating in a horizontal plane and embodied the brushes moistened with washing water in the one branch of the conveyor belt running in an oval shape; the brushes in the other branch of the oval were not moistened with washing liquid and served exclusively to remove and distribute adhering water. The eggs cleaned with the aid of the device were completely cleaned and showed no tendency to mould during storage and transport.

In the washing liquid circuit filter means were included for the purification of the water used for the cleaning so that the water could be recirculated.

What is claimed is:

1. A device for the removal of adhering dirt from eggs by means of a washing liquid comprising:
    washing liquid supply means,
    means for the generation of a relative movement of the eggs with respect to the washing liquid,
    transport means for the transporting of the eggs to be cleaned,
    egg guiding means and
    egg-surface cleaning means in which said transport means and egg guiding means cooperate to form egg-rotation means which causes an egg to rotate substantially around its shortest main axis.

2. A device according to claim 1, in which the egg rotation means for rotation of the egg around its shortest main axis comprises at least two mutually parallel guides which run parallel to the direction of movement of the transport means and which have a mutual distance which is smaller than the shortest main axis of the eggs to be cleaned and also protuberances on the transport means which pass through between the egg guides and project above these.

3. A device according to claim 1 in which the egg-surface cleaning means comprises two rotatably driven brushes disposed on opposite sides of said transport means which may be driven oppositely in a rotating manner, the axes of which are essentially parallel to the direction of the movement of the eggs.

4. A device according to claim 1 in which the egg guides are provided with a surface which increases friction.

5. A device according to claim 1 in which the egg transport means comprises an endless belt having the form of a thin strip of flexible material, standing with its plane vertical, while protuberances present on said band are formed by fork-shaped parts directed upwards.

6. A device according to claim 5 characterized in that the fork-shaped parts are inclined at an angle of 15°–30° to the direction of movement of the belt.

7. A device according to claim 1 in which the transport means for transporting the eggs to be cleaned comprises an endless belt provided with protuberances formed by fork-shaped parts directed upwards; these fork-shaped parts being followed in the running direction by soft rod-shaped flexible parts also essentially directed vertically.

8. A device according to claim 1, in which the washing liquid supply means are formed by washing liquid distributing means which extend parallel to said transport means.

9. A device according to claim 1, in which drying means for the eggs are provided which are formed by brushes arranged parallel to the direction of egg movement.

10. A device according to claim 1, in which the egg-surface cleaning means in the form of brushes rotate at 5–270 r.p.m. and preferably 150–250 r.p.m., while the transport means, comprising an endless band, have a speed of displacement of 300–1500 cm/min and preferably 600–900 cm/min.

11. A device according to claim 1 in which the egg-surface cleaning means comprises a single rotatably driven brush element.

* * * * *

UNITED STATES PATENT AND TRADEMARK OFFICE
CERTIFICATE OF CORRECTION

PATENT NO. : 4,750,229
DATED : June 14, 1988
INVENTOR(S) : Hermanus C. POEL et al It is certified that error appears in the above-identified patent and that said Letters Patent is hereby corrected as shown below:

FRONT PAGE:

Name of Third Inventor "Metheus E. Antonis" should be

--Matheus E. Antonis--.

Assignee "Antonis" should be --Matheus Everardus Antonis--.

Signed and Sealed this

Seventeenth Day of January, 1989

Attest:

DONALD J. QUIGG

Attesting Officer

Commissioner of Patents and Trademarks